United States Patent
Jiang

(10) Patent No.: US 7,388,883 B2
(45) Date of Patent: Jun. 17, 2008

(54) ABNORMAL CASE HANDLING FOR ACKNOWLEDGED MODE TRANSMISSION AND UNACKNOWLEDGED MODE TRANSMISSION

(75) Inventor: Sam Shiaw-Shiang Jiang, Hsinchu (TW)

(73) Assignee: Innovative Sonic Limited, Road Town, Tortola (VG)

( * ) Notice: Subject to any disclaimer, the term of this patent is extended or adjusted under 35 U.S.C. 154(b) by 888 days.

(21) Appl. No.: 10/428,549

(22) Filed: May 2, 2003

(65) Prior Publication Data
US 2003/0223385 A1 Dec. 4, 2003

Related U.S. Application Data

(60) Provisional application No. 60/380,106, filed on May 6, 2002.

(51) Int. Cl.
*H04J 3/16* (2006.01)
*H04L 12/56* (2006.01)

(52) U.S. Cl. .................. 370/470; 370/346; 370/392; 370/394

(58) Field of Classification Search ............. 370/395.1, 370/346, 252, 392, 394, 470
See application file for complete search history.

(56) References Cited

U.S. PATENT DOCUMENTS

| | | | | |
|---|---|---|---|---|
| 6,351,468 B1 * | 2/2002 | LaRowe et al. | ............. | 370/449 |
| 6,473,399 B1 | 10/2002 | Johansson et al. | ............. | 370/229 |
| 6,621,796 B1 * | 9/2003 | Miklos | ............. | 370/236 |
| 6,643,813 B1 * | 11/2003 | Johansson et al. | ............. | 714/748 |
| 2002/0048281 A1 * | 4/2002 | Yi et al. | ............. | 370/474 |

FOREIGN PATENT DOCUMENTS

WO   WO00/33503   6/2000

OTHER PUBLICATIONS $3_{rd}$ Generation Partnership Project, Technical Specification Group Radio Access Network, RLC protocol specification (relase Dec. 1999).

* cited by examiner

*Primary Examiner*—Barry Taylor
(74) *Attorney, Agent, or Firm*—Birch, Stewart, Kolasch & Birch, LLP

(57) ABSTRACT

Whenever the Receiver of this invention receives an AMD PDU or a UMD PDU with its "Length Indicator" having an invalid or a reserved value, the Receiver discards such a PDU and treats it as never received. The Receiver may report its receiving status accordingly if a report is required. This invention avoids invoking unnecessary RLC reset procedures and reduces the chance of losing HFN synchronization during AM or UM data transmissions.

10 Claims, 8 Drawing Sheets

ABNORMAL CASE HANDLING FOR ACKNOWLEDGED MODE TRANSMISSION AND UNACKNOWLEDGED MODE TRANSMISSION

CROSS REFERENCE APPLICATION

This application claims priority from U.S. Provisional Patent Application No. 60/380,106 filed on May 6, 2002.

BACKGROUND

This invention relates to wireless communication. More particularly, this invention provides more efficient way to handle several abnormal cases for Acknowledged Mode transmission and Unacknowledged Mode transmission.

Under the acknowledged mode (AM) in a wireless communication network, data transferred between two RLC peer entities (a UE or a UTRAN can be either a Sender or a Receiver) is in the Packet Data Unit (PDU) format. FIG. 1 illustrates the simplified procedure for Acknowledged mode data (AMD) transfer.

The Sender packages a Radio Link Control (RLC) Service Data Units (SDUs) received from upper layers into one or multi fixed-size AMD PDUs. If the AMD PDU is transmitted for the first time, the Sender shall set the "Sequence Number" field, its "Length Indicator" field and its "Polling Bit" accordingly. Otherwise, if the AMD PDU is retransmitted, the Sender uses the same "Sequence Number" as the original AMD PDU has. The Sender will update the "Length Indicator" field of a retransmitted AMD PDU due to that a piggybacked STATUS PDU is involved. Of course the Sender also sets the "Polling bit" accordingly. Afterward, if one or more AMD PDUs have been scheduled for transmission or retransmission, the Sender shall submit any ready AMD PDUs to lower layer to transmit.

Upon receiving an AMD PDU, the Receiver shall update its state variables for each received AMD PDU. The Receiver reassembles the received AMD PDUs into RLC SDUs. If "In-Sequence Delivery" is configured, the Receiver delivers the RLC SDUs in-sequence (i.e. in the same order as the RLC SDUs were originally transmitted by the peer entity—the Sender) to upper layers through the AM Service Access Point (AM-SAP). Otherwise, deliver the RLC SDUs in arbitrary order to upper layers through the AM-SAP.

Furthermore, the Sender and the Receiver uses a RLC reset procedure to resynchronize the peer entities when an abnormal condition happened. FIG. 2 illustrates the elementary procedure for an RLC reset. During the reset procedure the hyper frame numbers (HFN) in the Sender and the Receiver are synchronized. Usually, the RESET PDUs and the RESET ACK PDUs have higher priority than AMD PDUs. When a reset procedure has been initiated it can only be ended upon reception of a RESET ACK PDU with the same Reset Sequence Number (RSN) value as in the corresponding RESET PDU, or upon request of re-establishment or release from upper layer. A reset procedure is not interrupted by the reception of a RESET PDU from the peer entity.

The Sender and the Receiver use many techniques, such as the "Sequence Number" of each PDU, the "Length Indicator" with allowable values or reserved values, the transmitting and receiving window size and others, to monitor any error occurring during transmission and to maintain synchronization between them.

FIG. 3 illustrates how an AMD PDU with abnormal condition is processed. If the Receiver receives an AMD PDU outside the range of its reception window (Steps 5 and 10), the Receiver will discard the AMD PDU (Step 15) and go to Step 20. If the sequence number is within the range, then the Receiver checks if the value of "Length Indicator" of the received PDU is invalid or reserved (Step 40). If the "Length Indicator" has an invalid or a reserved value, the Receiver discards this AMD PDU and treats the discarded AMD PDU as a missing one (Step 50). An invalid value of the "Length Indicator" can be a value greater than the size of data field in the PDU. Additionally, an invalid value can be caused by using any value that violates the rules of the RLC protocol, such as using both values of 1111110 and 1111111 for "Length Indicator" in the same PDU, using the value 1111110 not followed by an extension bit of value 0, or using an incorrect order of the "Length Indicators" etc. Otherwise, if the "Length Indicator" is valid and is not reserved, the Receiver shall update its state variables (Step 45). Next, at Step 20, the Receiver checks if the "polling Bit" of the received AMD PDU is set to be "1". If it is, the Receiver shall initiate the STATUS PDU transfer procedure (Step 30) and then reassemble the received AMD PDUs into RLC SDUs (Step 55). Moreover, if the "Polling Bit" is not "1", the Receiver further checks if the "Missing PDU Indicator" is configured and the Receiver detects any missing AMD PDU (Step 25). If the Indicator is configured and a PDU is missing, the Receiver initiates the Status PDU transfer procedure in Step 30 and then go to Step 55. However, if "Missing PDU Indicator" is not configured or if the Receiver detects no missing PDU, the receiver will reassemble the received AMD PDU(s) into RLC SDU(s) and deliver the AMD SDU(s) to upper layers through AM_SAP (Steps 55, 60).

Also at the Receiver side, once the triggering of a STATUS report has occurred, as shown in FIG. 4, the Receiver first checks if there are active status prohibit functions or active "EPC mechanism" (Steps 70, 75). If there is, the Receiver delays the submitting of the STATUS PDU until the "STATUS prohibit" or "EPC mechanism" becomes inactive (Step 100). Otherwise, the Receiver shall include negative acknowledgements for all AMD PDUs detected as missing and positive acknowledgements for all AMD PDUs received up to at least VR(R) and set up optional Super Field variables into a STATUS PDU, which will be sent back to the Sender (Steps 80, 85, 90, and 95). At the Sender side, when the Sender receives a STATUS PDU from the Receiver (Step 105), the Sender checks if the STATUS PDU including "erroneous Sequence Number". If it does, the Sender shall discard the STATUS PDU and initiate the RLC reset procedure (Steps 135, 140). If the STATUS PDU does not include "Erroneous Sequence Number", the Sender updates its state variables, VT(A) and VT(MS) (Step 115). Then the Sender checks if the STATUS PDU include negatively acknowledged AMD PDUs (Step 120). If it does not, goes to Step 130. Otherwise, if it does, the Sender shall initiate the acknowledged data transfer procedure and retransmit these negatively acknowledged AMD PDUs. Last, at Step 130, the Sender processes optional Super Field variables as needed.

Under the unacknowledged mode (UM) in a wireless communication network, data transferred between two RLC peer entities also is in a Packet Data Unit (PDU) format. FIG. 5 illustrates the elementary procedure for unacknowledged mode data (UMD) transfer.

The Sender packages a Radio Link Control (RLC) Service Data Units (SDUs) received from upper layers into one or multi fixed-size UMD PDUs. The UMD PDU is transmitted once only. The Sender shall set the "Sequence Number" field and its "Length Indicator" field accordingly. For example, the UM data state variable, VT(US), contains the "Sequence Number" of the next UMD PDU to be transmitted. It shall be incremented by 1 each time a UMD PDU is transmitted. If one or more UMD PDUs have been scheduled for transmission, the Sender shall submit any ready UMD PDUs to lower layer for transmission. When the Sequence Number wraps around from the maximum value of 7-bit representation, i.e. 127, back to 0, the associated hyper frame number (HFN) is incremented by one. The HFNs are not sent explicitly in the UMD PDUs. Instead, they are maintained independently in the peer Sender and Receiver. A ciphering mechanism will use HFN as a parameter to cipher at the Sender and decipher at the Receiver. If the HFNs of the peer entity are not kept in synchronization, the ciphering mechanism will fail.

Upon receiving a UMD PDU from a Sender (Step 150), as shown in FIG. 6, the Receiver checks if the value of the "Length Indicator" of the received UM PDU is invalid or reserved (Step 155), e.g. the Receiver checks if the "Length Indicator" has a value that is either larger than the size of data field in the PDU (invalid) or a value specified to be reserved for UMD PDU for other purposes, such as functions for later releases. If it is invalid or is reserved, the Receiver discards the UMD PDU and treats the UMD PDU as missing (Step 160) then go to Step 190. Otherwise, the Receiver updates the Receiver Send Sequence State Variable, VR(US), to contain the "Sequence Number" following that of the last UMD PDU received (Step 170). For example, when a UMD PDU with "Sequence Number" x is received, the VR(US) shall be set to x+1. The Receiver further checks if any UMD PDU is missing, i.e. the Receiver checks if the updating step of VR(US) is greater than one (Step 175). If the updating step of VR(US) is not greater than one, the Receiver checks if the received UMD PDU is the first segment of an SDU by looking for a predefined "Length Indicator" value "1111100" or "1111 11111111 100", which is used to indicate the first data octet in this UMD PDU is the first octet of an RLC SDU (Steps 180, 185). If the received UMD PDU is not the first segment of an SDU, the Receiver shall assemble the received UMD PDU into RLC SDU(s) and submit the RLC SDU(s) to upper layer through UM-SAP (Steps 195 and 200). However if there is any missing UMD PDU detected in Steps 175 and 160, the Receiver shall discard any SDU(s) having segments in the missing UMD PDU(s) (Step 190).

Overall, the prior art has an inefficient way to process an AMD PDU with its "Length Indicator" having an invalid or a reserved value in an Acknowledged Mode transmission. There are cases caused by the physical layer CRC residue error so that the erroneous bit string of the AMD PDU is not detected by the CRC scheme. In this situation, sequence number of the AMD PDU might also contain errors. The Receiver treats an AMD PDU with its "Length Indicator" having an invalid or a reserved value as a missing PDU. See Step 50 in FIG. 3. When a status report is triggered, the report would include negative acknowledgement of this AMD PDU of possible contaminated sequence number. See Step 80 in FIG. 4. Moreover, if the contaminated sequence number is outside the transmission window, the Sender recognizes this status report as containing an "erroneous Sequence Number" and will initiate a RLC reset procedure accordingly. (See Step 140 in FIG. 5). Thus, when the AMD PDU with invalid or reserved length indicator is treated as a missing PDU, the Sender might initiate an unnecessary RLC reset procedure.

The similar inefficient process also occurs in an Unacknowledged Mode Transmission. Where the Receiver may receive a UMD PDU with its "Length Indicator" having an invalid or a reserved value. Just as the AM transmission, this may because of a physical layer CRC residue error, i.e., there are errors in the bit string of the UMD PDU and these errors are not detected by the CRC scheme. In this situation, sequence number of the UMD PDU might also contain errors. In the prior art design, the Receiver treats a UMD PDU with invalid or reserved "Length Indicator" as a missing PDU. If the sequence number is also contaminated, the Receiver will discard wrong SDUs. See Steps 160 and 190 in FIG. 6. In addition, if the contaminated sequence number changes the order from increment to decrement compared to the previously received UMD PDU, the Receiver will discard the UMD PDU but will mistakenly increment the HFN value so that the HFNs will not be synchronous with the Sender any more. Consequently, the ciphering mechanism will fail and cause all the following transmitted UMD PDUs lost. Thus, when the UMD PDU with a "Length Indicator" having an invalid or a reserved value is treated as a missing PDU, the Receiver might discard wrong SDUs and also might make the HFNs unsynchronized with the Sender.

SUMMARY

To avoid invoking unnecessary RLC reset procedure or losing HFN synchronization, a better and more efficient method to handle an AMD PDU or UM PDU with its "Length Indicator" having an invalid or a reserved value is needed.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE INVENTION

This invention modifies the way the prior art processing a PDU with its "Length Indicator" having an invalid or a reserved value. In AM, when the Receiver receives an AMD PDU with an invalid or reserved value of a "Length Indicator", instead of discarding the AMD PDU and treating it as missing, the Receiver shall discard the AMD PDU and treat it as never received, while setting up the content of a status report accordingly.

Figure 1:
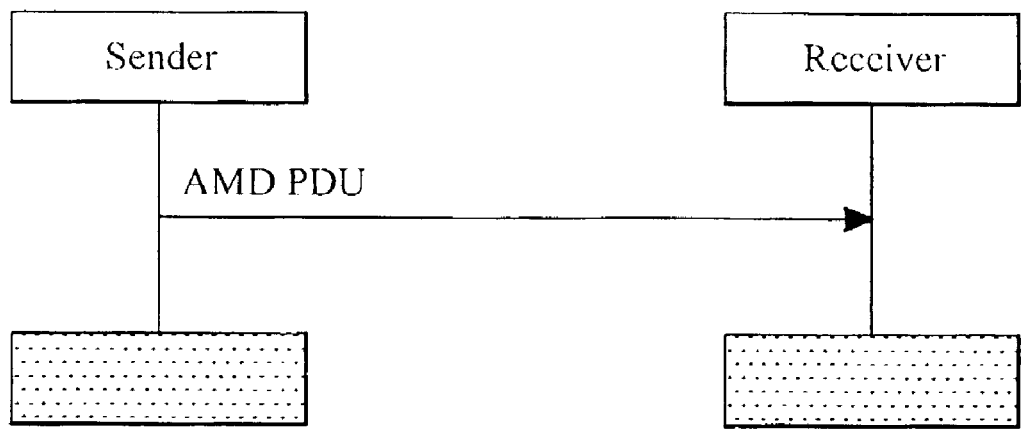
FIG. 1 illustrates a simplified AM data transfer procedure.
Figure 2:
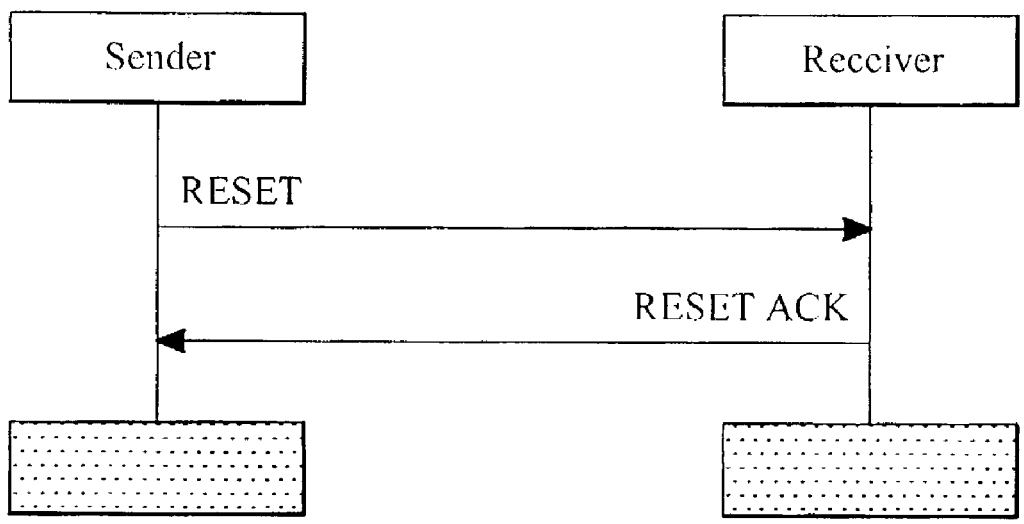
FIG. 2 illustrates the elementary procedure for an RLC reset.
Figure 3:
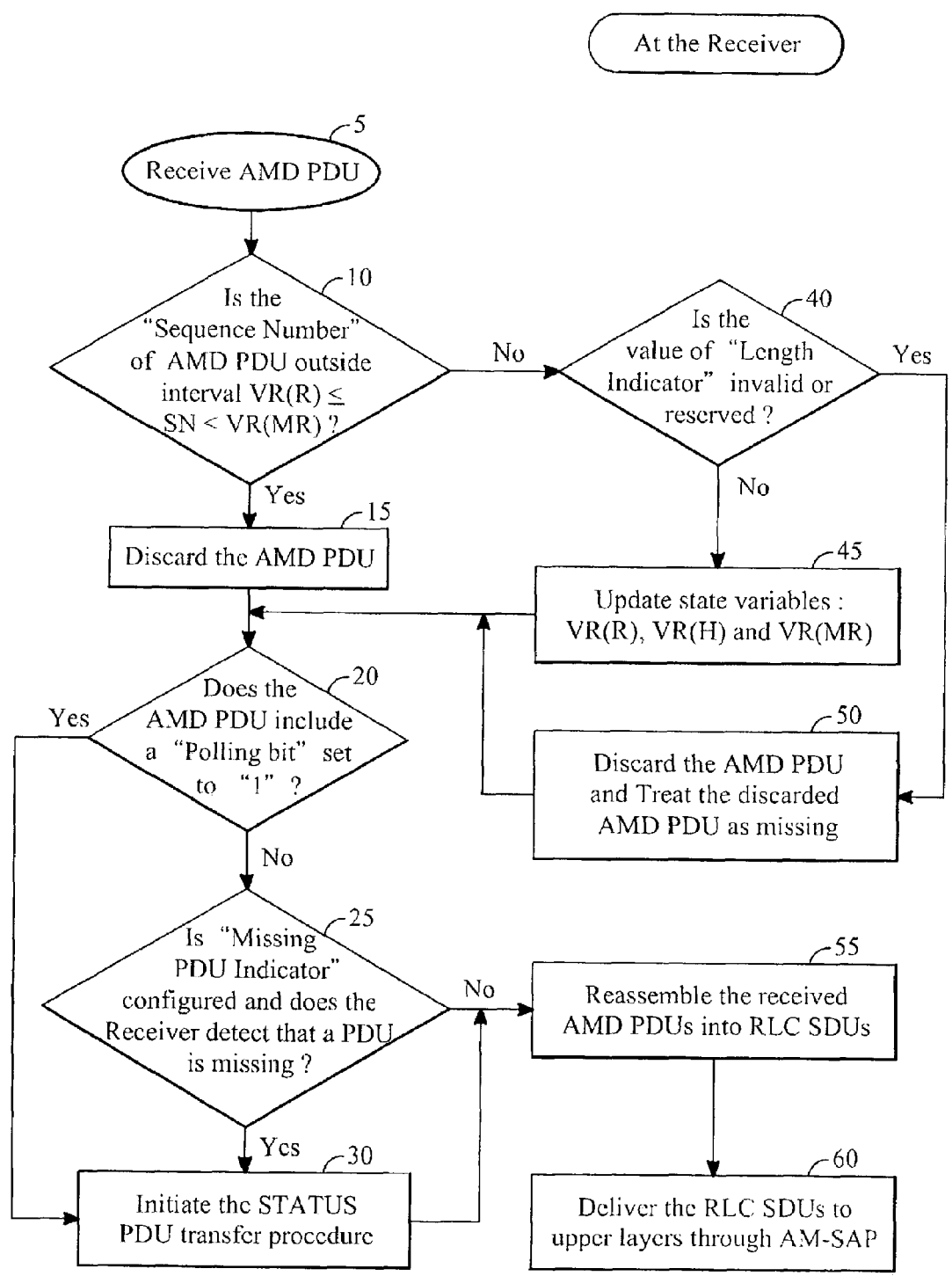
FIG. 3 briefly illustrates the AMD PDU handling procedure by the Receiver for the received AMD PDUs.
Figure 4:
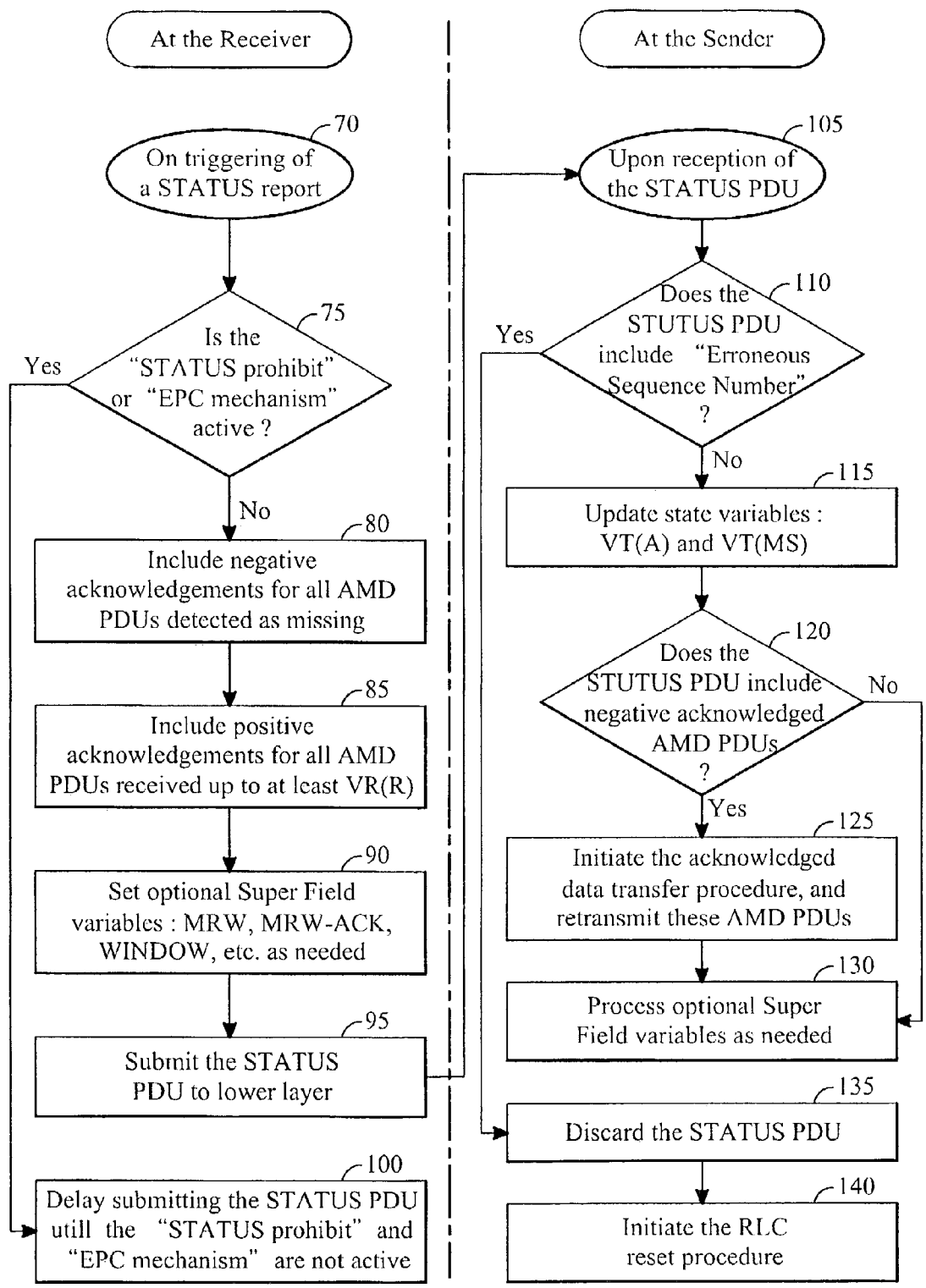
FIG. 4 briefly illustrates a STATUS report handling procedure by a Sender and a Receiver in AM.
Figure 5:
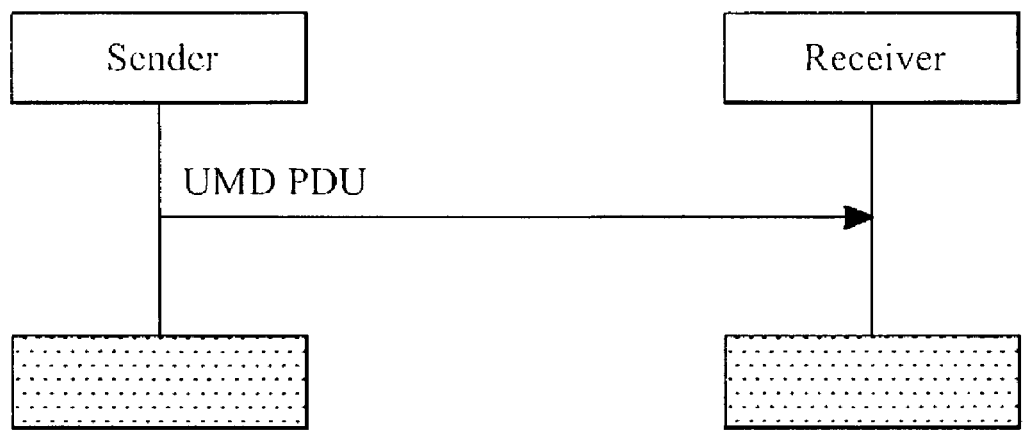
FIG. 5 illustrates a simplified UM data transfer procedure.
Figure 6:
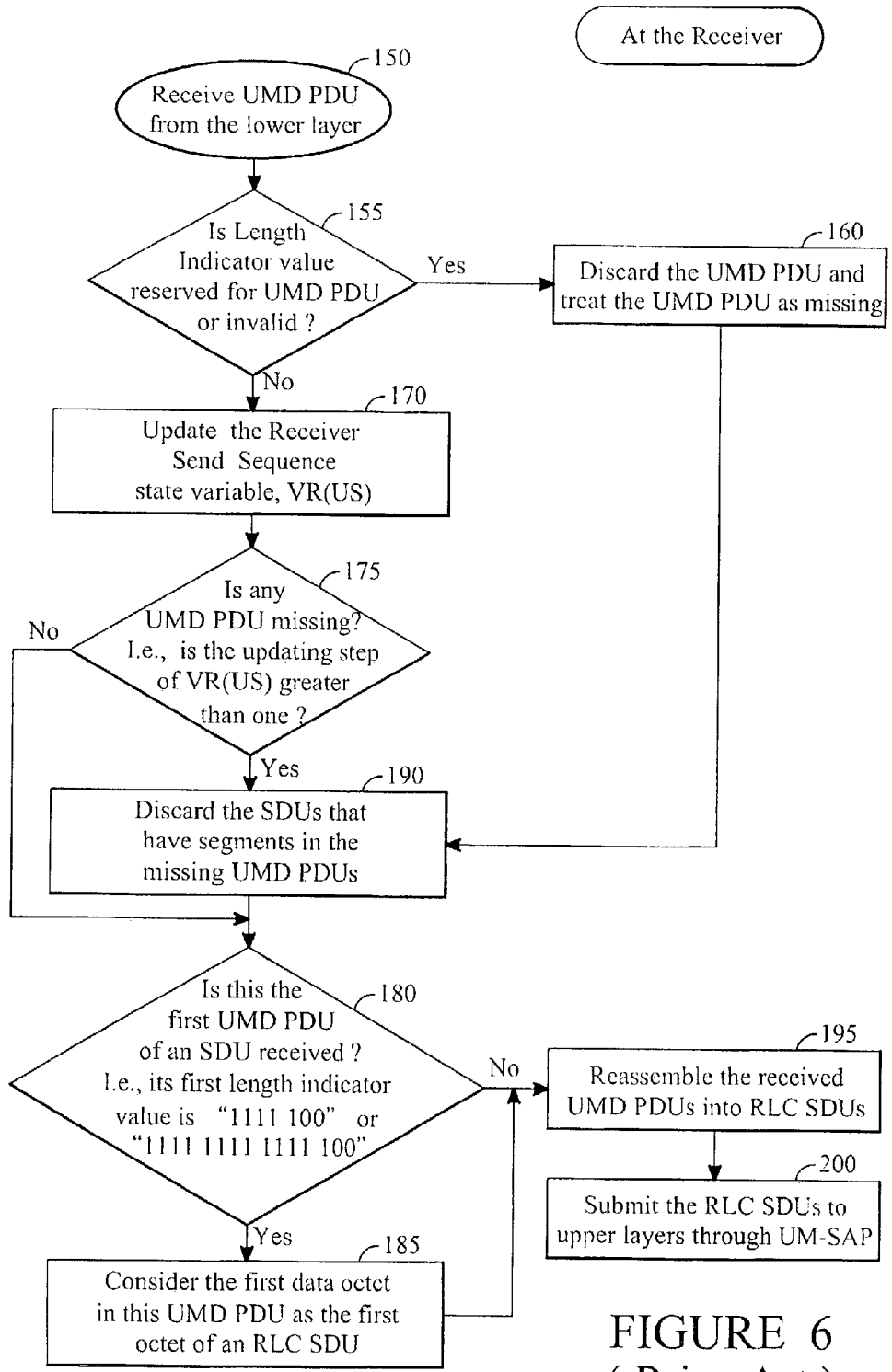
FIG. 6 briefly illustrates the UMD PDU handling procedure by the Receiver when a UMD PDU is received.
Figure 7:
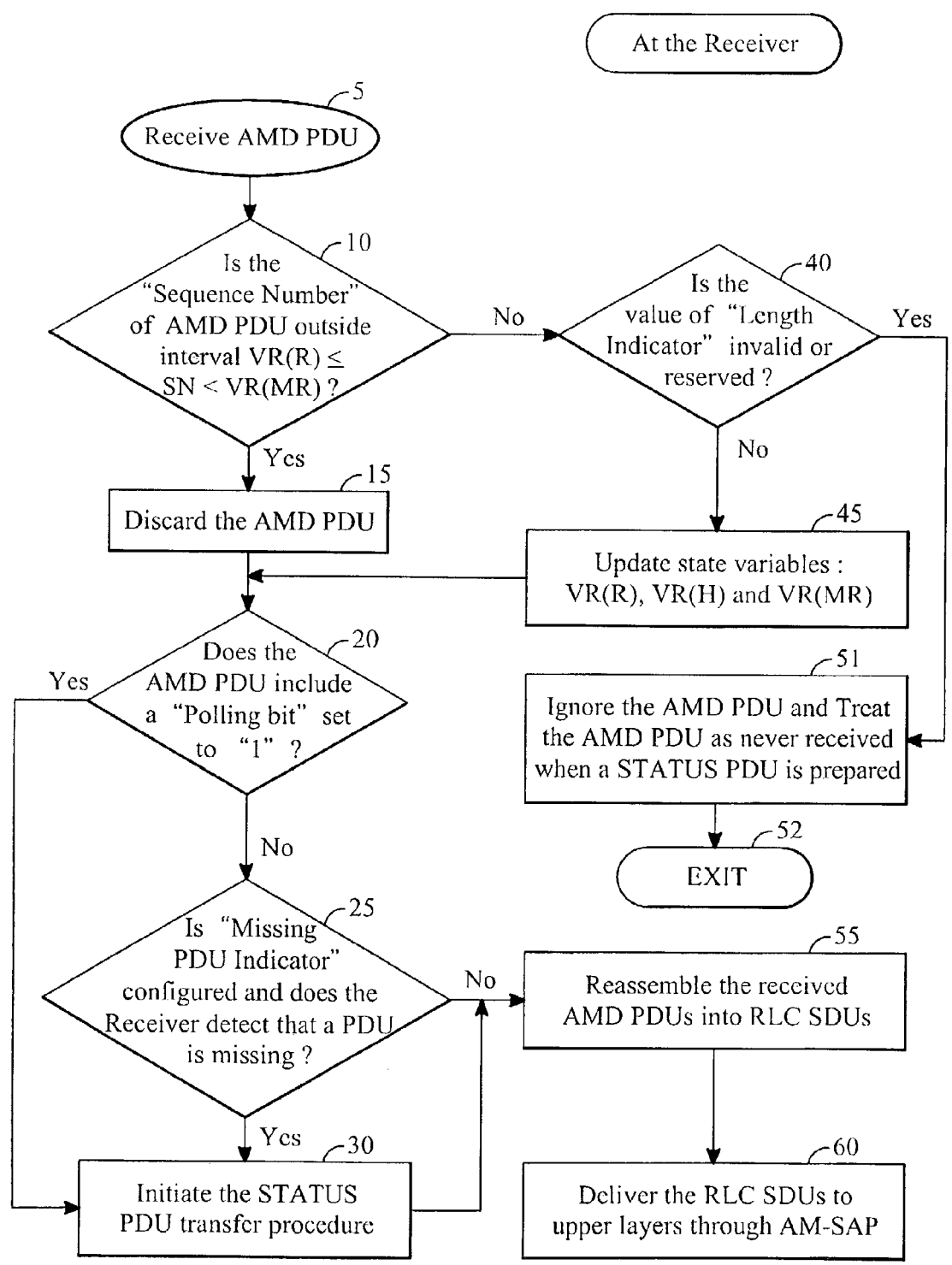
FIG. 7 briefly illustrates the AMD PDU handling procedure of the invention by the Receiver for the received AMD PDUs.
Figure 8:
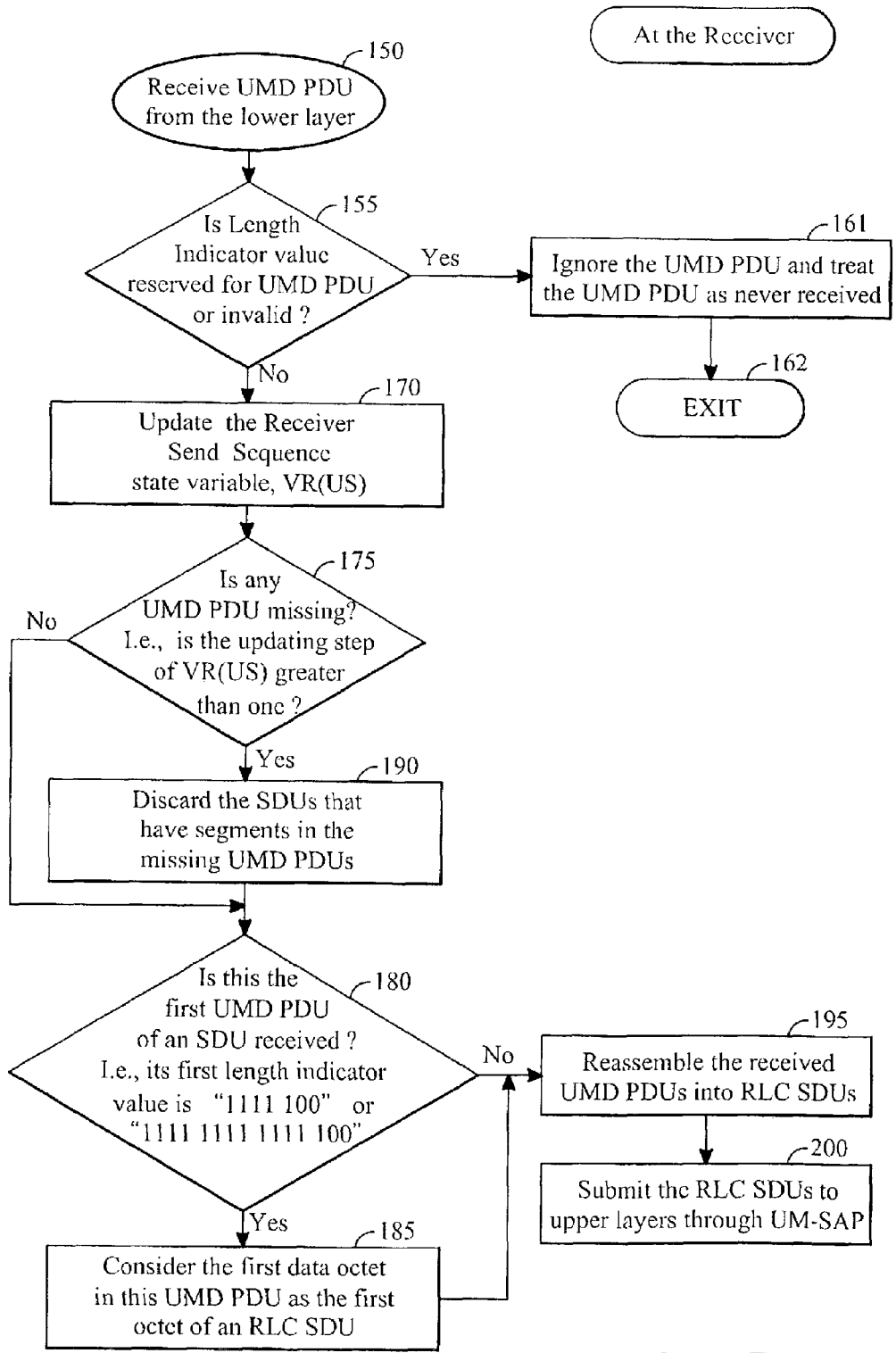
FIG. 8 briefly illustrates the UMD PDU handling procedure of the invention by the Receiver when a UMD PDU is received.

FIG. 7 is an exact copy of FIG. 3, except Step 50 in FIG. 3, which is changed to Step 51 in FIG. 7 where the Step 51 will "ignore the AMD PDU and treat the AMD PDU as never received when a STATUS PDU is prepared". Furthermore, Step 52 follows Step 51 in FIG. 7 and the procedure ends. The similar modification shall be implemented in UM. FIG. 8 is an exact copy of FIG. 6 except Step 160 of FIG. 6, which is replaced with Step 161 of FIG. 8. When the Receiver receives a UMD PDU with it "Length Indicator" having an invalid or a reserved value, instead of discarding the UM PDU and treating the UM PDU as missing, the Receiver shall discard or ignore the UMD PDU and treat it as never received while the Receiver maintains the HFN values and discards relevant SDUs accordingly. Thus, Step 160 of FIG. 6 shall be changed to Step 161 of FIG. 8 where the step will "ignore the UMD PDU and treat it as never received". Of course, there is no need to go to Step 190 after Step 161 In FIG. 8. Instead, Step 162 follows Step 161 in FIG. 8 and the procedure ends.

Figure 9:
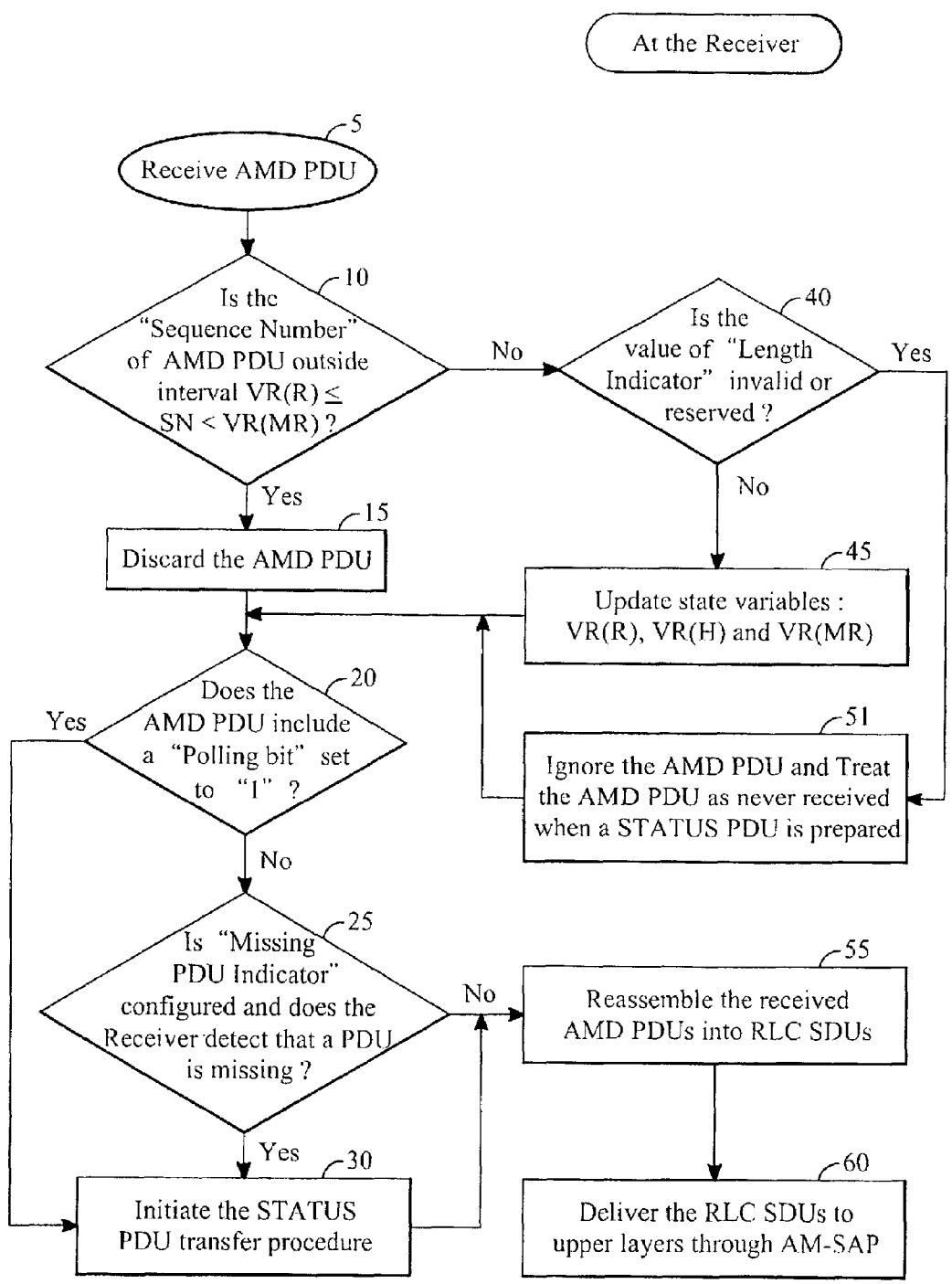
FIG. 9 briefly illustrates another AMD PDU handling procedure of the invention by the Receiver for the received AMD PDUs.

Moreover, in AM, once the receiver receives an AMD PDU with its "Length Indicator" having an invalid or a reserved value, besides discarding the AMD PDU, the Receiver shall further check if its "Polling Bit" in the discarded AMD PDU is set to "1". If it is, the AMD PDU will trigger a poll for status report, the Receiver sends a status report with the content set as if the AMD PDU is never received. This is illustrated in FIG. 9. FIG. 9 is an exact copy of FIG. 7 with the exception that the procedure goes to Step 20 after Step 51 in FIG. 9.

For the AM transmission case, when an unnecessary RLC reset procedure is initiated, the network wastes a lot of radio resource since RESET PDUs and RESET ACK PDUs needed to be signaled between the peer entities. In addition, the network data transmission will be further delayed due to many unnecessary occurrences of RLC reset procedure. This invention can help the existing networks and mobiles to avoid many unnecessary RLC reset procedures and to enhance their efficiency. With respect to the UM transmission case, the invention can help the existing networks and mobiles to avoid from discarding wrong SDUs and the problems of HFN unsynchronization.

The present invention will become more fully understood from the detailed description given hereinbelow and the accompanying drawings which are given by way of illustration only, and thus are not limitative of the present invention, and wherein.

What is claimed is:

1. A method to reduce the occurrences of radio link control (RLC) reset during data block transmission between a sender and a receiver in a wireless communication system, wherein data blocks may contain a plurality of fields, wherein the method comprising:

at the receiver:
    receiving a data block from the sender while the data transmission operation is in an acknowledge mode;
    determining a condition of a particular field of the plurality of fields of the data block; and
    ignoring the data block when the condition of the particular field is one of a plurality of abnormal conditions;
    wherein ignoring the data block includes treating the data block as if it has never been received instead of treating the data block as missing when preparing a status report.

2. The method of claim 1, wherein the particular field is a "Length Indicator" field.

3. The method of claim 2, wherein the one of the plurality of abnormal conditions comprises an invalid length indicator.

4. The method of claim 2, wherein the one of the plurality of abnormal conditions comprises a length indicator having a reserved value.

5. The method of claim 2, wherein treating the data block as if it has never been received further comprises:
    checking a "Polling Bit" field of the data block; and
    when the "Polling Bit" indicates that a status report is requested, reporting a receiving status with the content set as the data block has never been received.

6. A receiver for reducing the occurrences of radio link control (RLC) reset during data block transmission between a sender and a receiver in a wireless communication system, wherein data blocks may contain a plurality of fields, wherein the receiver comprising:
    means for receiving data block from the sender while the data transmission operation is in an acknowledge mode;
    means for determining a condition of a particular field of the plurality of fields of the data block; and
    means for ignoring the data block when the condition of the particular field one of a plurality of abnormal conditions;
    wherein ignoring the data block includes treating the data block as if it has never been received instead of treating the data block as missing when preparing a status report.

7. The receiver of claim 6, wherein the particular field is a "Length Indicator" field.

8. The receiver of claim 7, wherein the one of the plurality of abnormal conditions comprises an invalid length indicator.

9. The receiver of claim 7, wherein the one of the plurality of abnormal conditions comprises a length indicator having a reserved value.

10. The receiver of claim 7, wherein treating the data block as if it has never been received while preparing a status report further comprising:
    means for checking a "Polling Bit" field of the data block; and
    when the "Polling Bit" indicates that a status report is requested, means for reporting a receiving status with the content set as the data block has never been received.

\* \* \* \* \*